April 7, 1931. W. M. HOLLOWAY 1,799,465
MEANS FOR AUTOMATICALLY SOLDERING THE SIDE
SEAMS OF CONTAINERS AND THE LIKE
Filed May 24, 1926 10 Sheets-Sheet 1

Inventor
William M. Holloway
By Munday Clarke
& Carpenter
Att'ys.

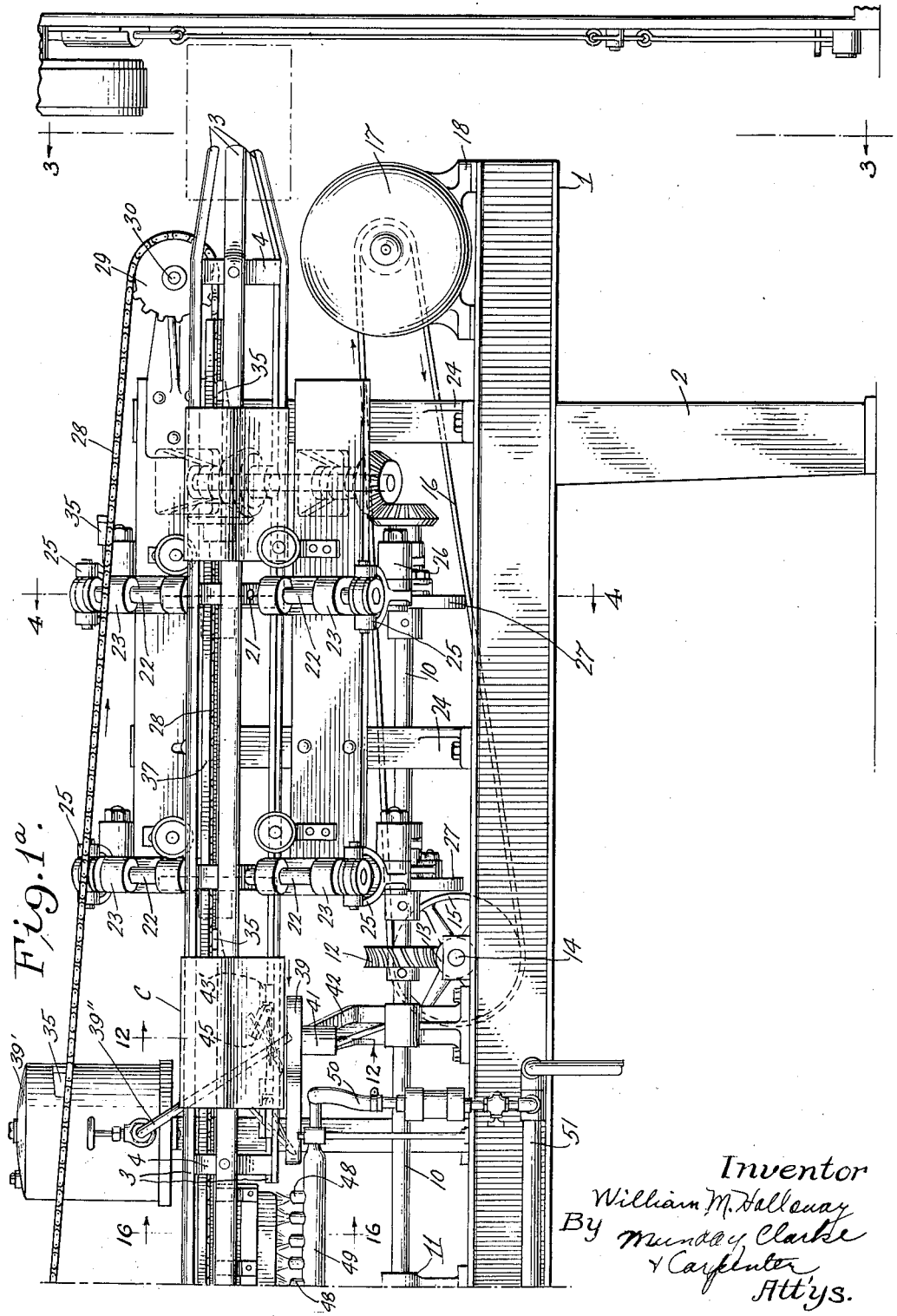

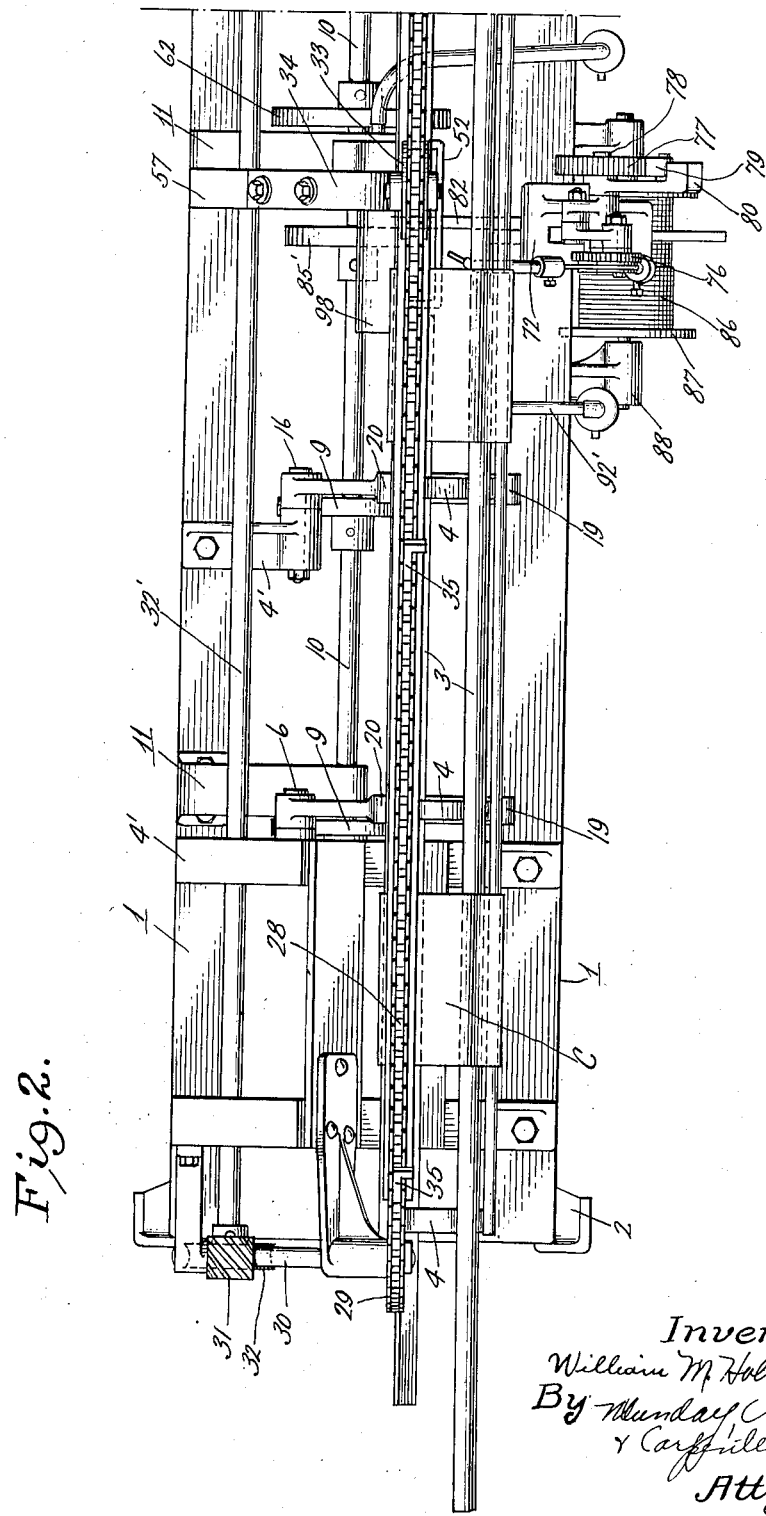

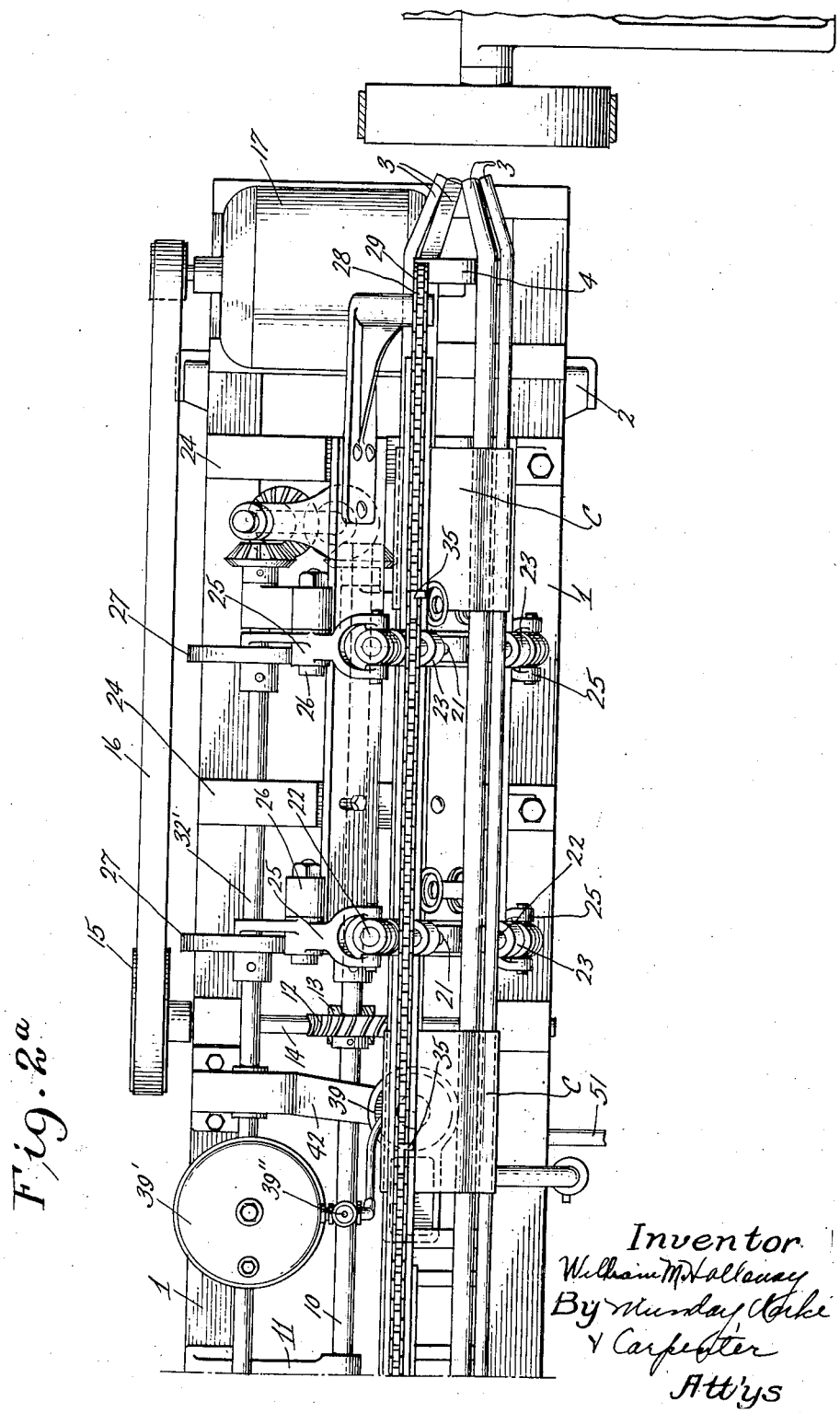

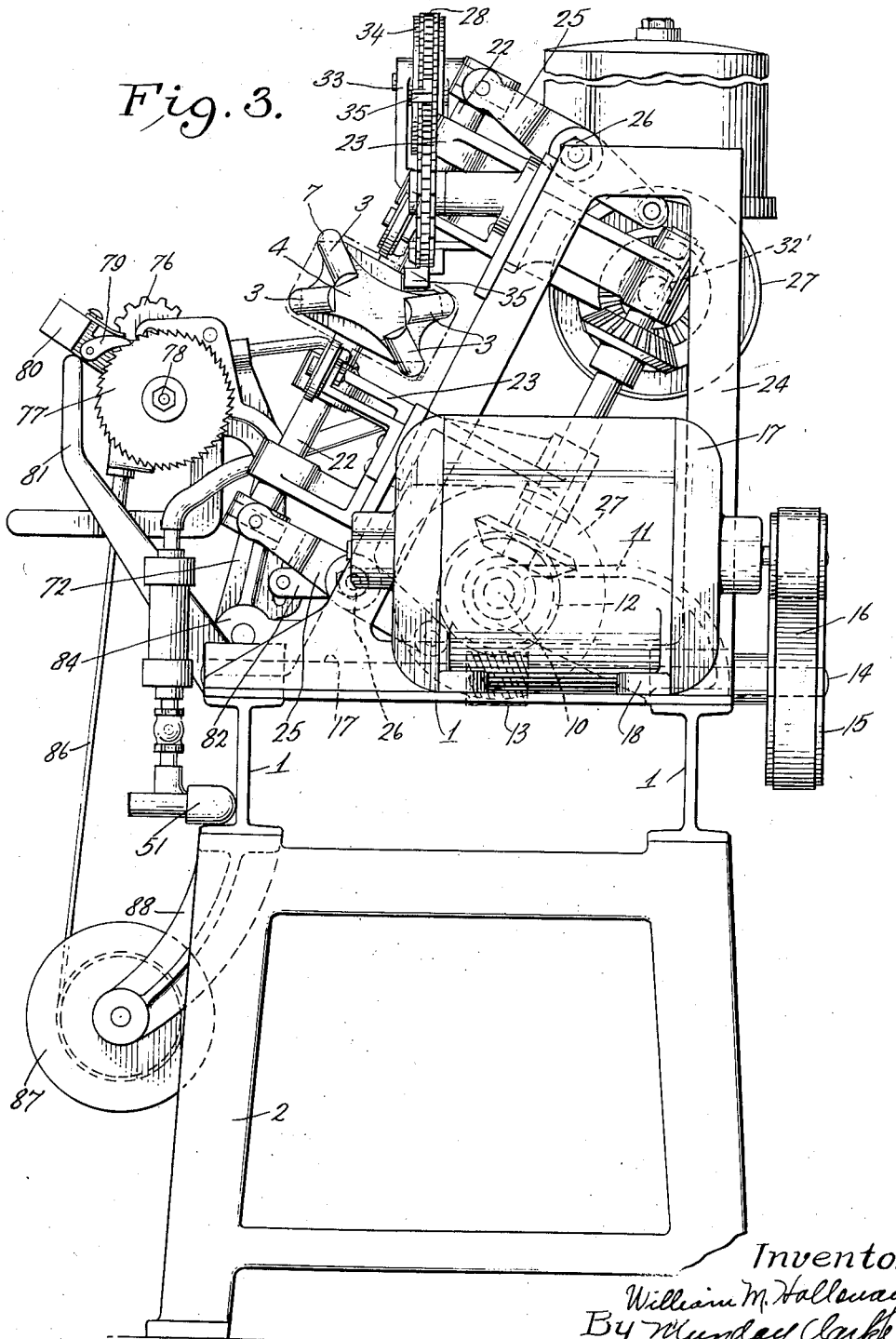

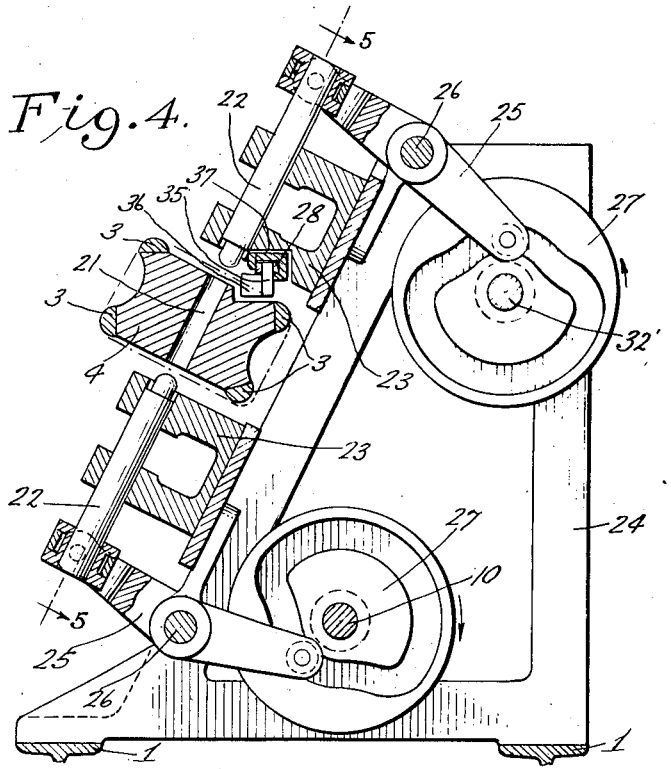
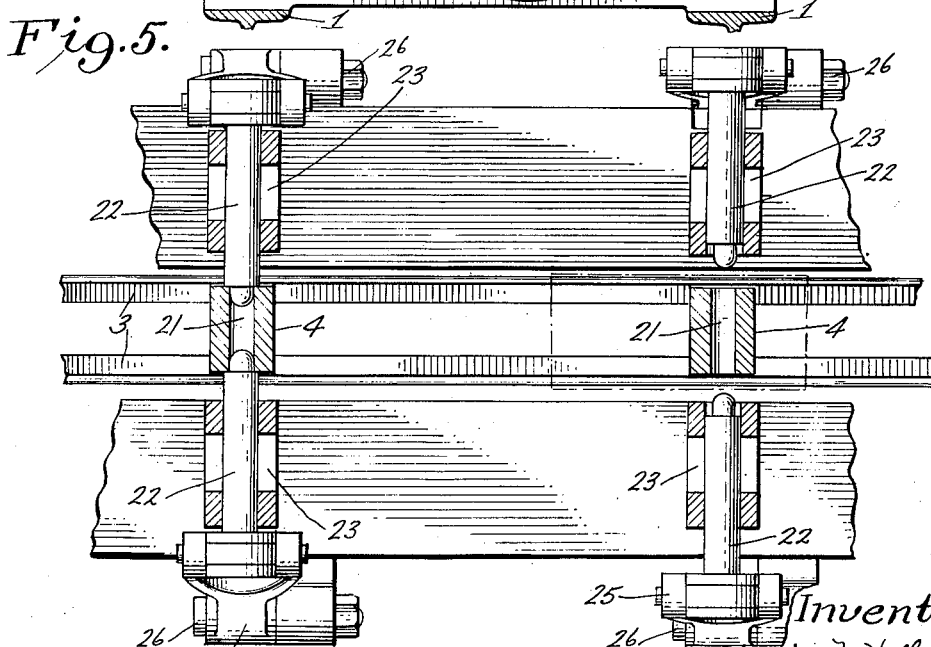

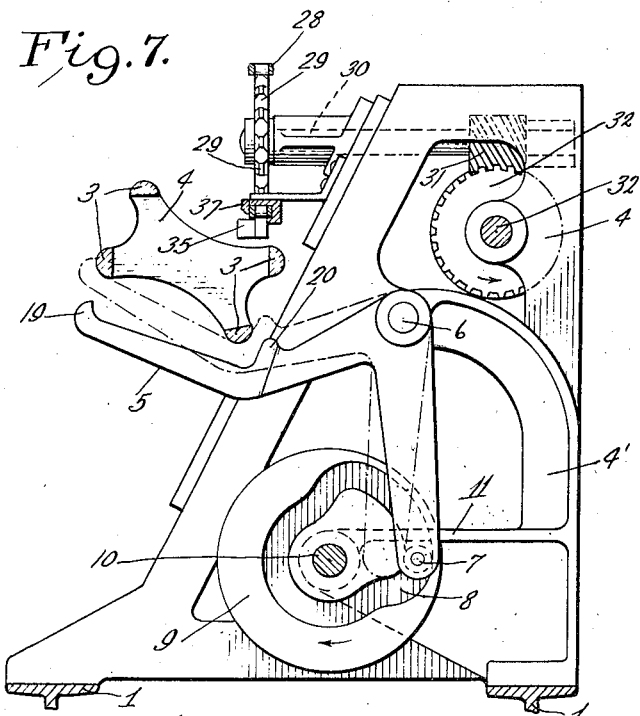
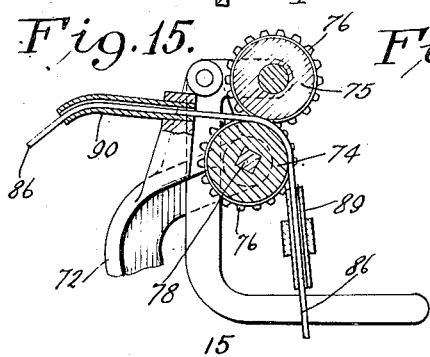
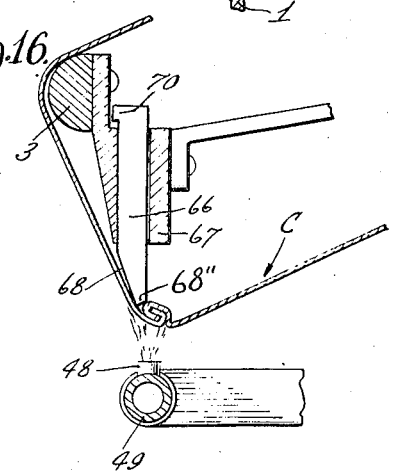
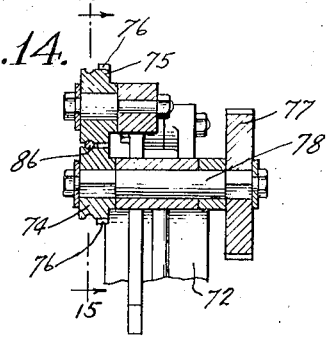

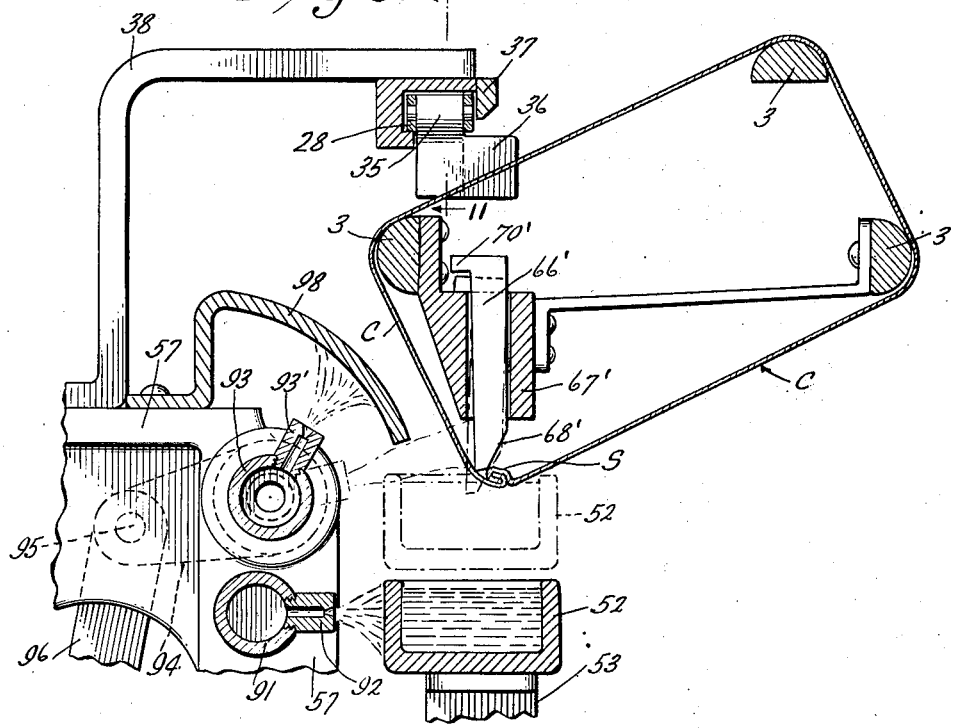
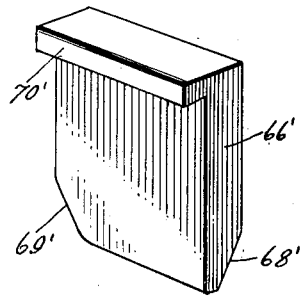
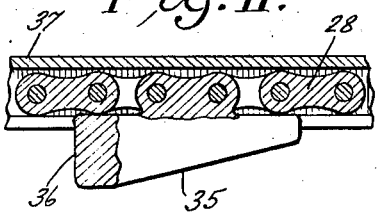

Patented Apr. 7, 1931

1,799,465

UNITED STATES PATENT OFFICE

WILLIAM M. HOLLOWAY, OF CHICAGO, ILLINOIS, ASSIGNOR TO AMERICAN CAN COMPANY, OF NEW YORK, N. Y., A CORPORATION OF NEW JERSEY

MEANS FOR AUTOMATICALLY SOLDERING THE SIDE SEAMS OF CONTAINERS AND THE LIKE

Application filed May 24, 1926. Serial No. 111,195.

The present invention is concerned with an automatic machine, primarily intended for soldering lithographed cans, both square and round. Previous to the development of this invention, it was customary in lithographing sheets for cans of this type to leave a relatively wide blank strip along the two edges on which the hooks were to be formed that were finally interlocked into the double-seam of the can body. The reason for these undecorated strips or spaces adjacent the double seam was to permit the soldering operation without the disfigurement or burning of the lithographed decoration. Under the old process, the soldering operation with the bare space on each side of the double seam, was done in automatic machinery, and sufficient heat applied to thoroughly sweat the seam without sufficient heat reaching the edge of the lithographed portion to cause discoloration. In the present process and in the machine for carrying out the process, it is now possible to lithograph the entire outer surface of the can body, except the very narrow edge that is eventually formed into the interlocked double seam, so that the appearance of the can after this seam is formed is that of a completely lithographed body with no exposed or naked tin on the outside adjacent the double seam. The manner of preheating the can body, after the flux has been applied to bring the can near the temperature of the molten solder is not sufficient to cause discoloration where the flame comes in contact with the decoration while the can is moving, and the solder being applied to the inside of the can by means of the specially designed and shiftable soldering irons, and the manner of applying the soldering to the irons does not cause any discoloration of the decoration on the outside.

In the new apparatus, as the can is automatically conveyed over the soldering horn or horse, the interior of the side seam is automatically fluxed. The can then passes through jets of preheating flame to bring the interfolded seam and adjacent parts of the can body to near soldering temperature, and as long as the can is kept moving while in contact with these preheating flames, no discoloration of the exterior decoration takes place, due to the high temperature to which this decoration was previously subjected in the drying ovens during the lithographing process. As soon as the cans pass these preheating flames, they immediately pass into the zone of the inside soldering apparatus, which adds the additional necessary heat to cause the solder to flow into the interlocked seam and produce a properly sweated seam.

My improved automatic means for soldering the inner surfaces of the side seams of this type possesses many advantages over any hand soldering operation. In hand soldering cans of this type, there is always more or less danger of discoloring the lithographing on the outside of the can, due to an overheating of the soldering iron, which is left in contact with the seam for too long a time in the hand manipulation, and due also to the fact that the decorated surface is underneath and not within the vision of the operator, so that he is not able to see whether or not he is discoloring the decoration. Another trouble connected with the hand soldering of this type of can, is due to the variation in temperature of the soldering irons, which are usually heated in an open gas fire heater and an operator may be inclined to use an iron after it is too cold to do first class work, which will result in a considerable variation in the depth the solder will penetrate the interlocked portion of the seam, while in the machine disclosed in the invention, the preheating temperature and the soldering temperature are practically constant, so that each can is subjected to this operation for the same length of time and under the same temperature conditions. In the hand soldering operation there is also some difficulty encountered in the application of the flux that is necessary to be applied to the seams before the solder is applied. The hand operator uses a brush or a swab carrying a varying quantity of flux material, which is applied somewhat indefinitely, and variably, resulting in a variation in the quality of solder seam produced, as well as many times applying much more flux than is necessary for the job, which results in messing up the inside of the can and where acid flux is used, producing a pus element or pollution or deterioration of the contents to be packed in the can, while on the automatic machine the amount of flux applied to each can is uniform throughout a days run.

One of the objects of my present invention resides in providing a machine for automatically soldering the inner surface of the side seam of cans and containers, the exterior surfaces of which are lithographed or decorated relatively close to the side seam, and in such a manner that such lithographing or decorating is not discolored or damaged.

Another object of my present invention resides in providing an apparatus including a relatively long horn adapted to receive thereover a succession of can bodies having side seams to be soldered, together with means for continuously feeding said can bodies in spaced relation along said horn, together with means for automatically soldering the interior walls of said side seam as the cans are moved therealong.

Still another object of my present invention resides in providing an apparatus comprising a relatively long horn adapted to receive thereover a series of cans having side seams which are to be soldered, together with means for moving the series of cans along the horn, together with means for automatically soldering the interior walls of such side seams while the cans are on the horn.

Another object of my invention resides in providing an apparatus comprising a floatingly mounted horn having free extremities to receive and discharge a succession of hollow can bodies provided with side seams to be soldered, together with means for moving said can bodies over said horn and means for automatically soldering said bodies while on said horn, said horn being constructed and arranged to permit the passage of said bodies thereover.

Another object of my invention resides in providing an apparatus comprising a relatively long floating horn having free extremities adapted to receive and discharge cans fed lengthwise thereof, means for automatically operating upon said can bodies during their transportation along said horn, and means for mounting said horn to permit the free passage of said can bodies lengthwise thereof.

Another object of my invention resides in a floatingly mounted horn adapted to receive a succession of hollow can bodies thereover, said horn and its mounting being constructed and arranged to permit the can bodies to pass onto the horn at one end, to move freely therealong and to be discharged from the other end.

Another object of my invention resides in providing a horn having free ends and adapted to receive thereover a can body to be operated upon, together with means for transporting the can body along said horn and for operating upon said can body during its passage, means for supporting said horn at a plurality of points, said means being constructed and arranged to permit the free passage of the can body along the horn without interruption.

Another object of my present invention resides in providing an apparatus comprising a relatively long horn having free ends and adapted to receive a can body thereover, together with means for feeding the can body along said horn and for operating upon it during its passage therealong, and means for supporting the horn at a plurality of points.

Still another object of my invention resides in providing an apparatus comprising a relatively long horn having free ends and adapted to receive a can body thereover, together with means for feeding the can body along said horn and for operating upon it during its passage therealong, and means for supporting the horn periodically at a plurality of points spaced along the horn, said means being constructed and arranged to act in timed relation with the passage of the can along the horn to automatically release the supporting means in front of the horn to permit its free passage therealong.

Another object of my present invention resides in providing a floating horn having free ends and adapted to receive thereover a succession of hollow container bodies adapted to be operated upon, a plurality of shiftable supports adapted to be moved toward and from said horn to support the latter at a plurality of points spaced along said horn, and automatic means operated in timed relation with the passage of the can along the horn for controlling the shifting of said horn supporting means.

Another object of my invention resides in providing a floating horn having free ends, one of which is adapted to receive a can thereover and the other adapted to discharge a can therefrom, together with means for supporting said horn while permitting the free passage of a can therealong, together with means for preventing endwise movement of said horn.

Another object of my invention resides in providing a floating horn having free ends, one of which is adapted to receive thereover a hollow container and the other of which is adapted to discharge said container therefrom, together with means for moving said container along said horn, shiftable means adapted to engage said horn to support the latter, said means being constructed and arranged to prevent endwise movement of said horn during the feeding of the can.

Another object of my invention resides in the provision of a relatively long horn adapted to receive thereover a succession of hollow can bodies, together with a track mounted over and spaced from said horn, said track adapted to receive an endless conveying means provided with a plurality of outstanding lugs which are adapted to pass lengthwise over said horn and thereover, and to engage said can bodies and freely push them along said horn in spaced succession.

A further object of my invention resides in the provision of a horn, means for feeding can bodies with side seams therealong, and means for automatically fluxing the side seam of the can body during its passage along said horn.

Another object resides in the provision of a horn having free ends, one of which is adapted to receive thereover a can body provided with a side seam, and the other end of which is adapted to discharge the can body therefrom, together with means for automatically fluxing the inner wall of said side seam during its passage along said horn.

Another object of my invention resides in the provision of a horn having free extremities adapted to permit the positioning of a can body on said horn, its passage therealong and its discharge therefrom, means for supporting said horn to permit the free passage of said can body therealong, and means supported by said horn and constructed and arranged automatically to flux the inner seam of said can body during this passage.

Another object of my invention resides in the provision of a horn adapted to receive a can body thereover, means for transporting the can body therealong, a reservoir of fluxing material, a flux applying member adapted to be immersed in said fluxing material, and means for automatically withdrawing said applying member from said material and for bringing said member into contact with the inner walls of the side seams of can bodies for fluxing said side seams, during the passage of said cans along said horn.

Another object of my present invention resides in the details of construction of the flux applying member and in the manner of automatically fluxing the side seam during the passage of the can along the horn.

Another object of my invention resides in the means for initially preheating the walls of the can body adjacent the side seam, and the side seam thereof, during the passage of the can body along its supporting horn, and prior to the soldering operation whereby to facilitate the soldering operation.

Still another object of my invention resides in the provision of a horn, together with means for automatically feeding a can body along said horn, means for automatically fluxing the side seam of said can body, means for automatically heating the side seam of said cam body to dry said flux and prepare the side seam for the soldering operation, means for automatically soldering said side seam, all of said means taking place during the transportation of the said can body along said horn.

Another object of my present invention resides in a means for automatically soldering the inner faces of the side seam of a container body during its passage over and along a supporting horn.

Still another object of my invention resides in the provision of an automatic means for applying a definite quantity of solder to the inner faces of a side seam of a container body during its passage along a supporting horn.

Yet another object of my invention resides in the means for automatically heating the walls of a can body at and adjacent the side seam thereof during the passage of the can body along its supporting horn, together with means for automatically applying solder to the inner face of the side seam during the passage of said body along the horn.

A further object of my invention resides in the provision of a supporting horn having free ends adapted to receive a can body thereover, together with means for transporting the can body along said horn, and means for automatically heating the walls of said can body at and adjacent the side seam thereof, together with means for automatically supplying solder to the inner walls of said side seam.

Another object of my invention resides in the provision of a floating horn provided with free ends adapted to permit the positioning of a can body onto said horn, its passage therealong and its discharge therefrom, together with means for automatically heating the can body adjacent the side seam thereof, together with a reservoir containing solder, means for heating said solder to maintain it in a molten state, and means for automatically applying a definite quantity of said solder to the inner faces of the side seam of the can body during its feeding movement along said horn.

Another object of my invention resides in the means for automatically supplying solder to the mechanism which applies solder to the inner faces of the side seam of the can body during its movement along the horn.

Another object of my invention resides in the construction of the solder applying mechanism, including the shiftable solder pot, the means for heating the solder pot, the soldering irons and the means for heating the soldering irons, all of which are arranged automatically to function in timed relation with the passage of the side seamed can body along the horn.

Another object of my invention resides in the means for automatically withdrawing the flame from its projection onto the soldering irons during the passage of the can body into the zone of the flame projection, whereby to prevent damage of the decoration on the outer face of the can body.

Another object of my invention resides in the means for automatically replenishing the quantity of solder in the solder pot.

Another object of my invention resides in the means for automatically and periodically supplying a predetermined amount of solder to the solder pot.

Another object of my invention resides in means for controlling the amount of solder applied to the side seam and in the means for controlling the amount of solder periodically and automatically supplied to the solder pot.

Another object of my invention resides in the details of construction of the solder supplying mechanism.

Another object of my invention resides in the specific details of the construction of the soldering irons and particularly in the shiftable mounting of these irons, whereby they automatically seat themselves and find the side seam on the inner walls of the can body.

Another object of my invention resides in the provision of a freely depending shiftably mounted soldering iron provided with an inclined face adjacent the soldering edge of the iron, which inclined face is constructed and arranged to contact a portion of the side seam, whereby to automatically position the solder applying edge of the iron at the desired point on the side seam.

Another object of my invention resides in the details of construction of the skeleton like horn, for supporting the can body, and in the manner of mounting the solder applying iron and also the flux applying mechanism on the horn.

Numerous other objects and advantages of the invention will be apparent as it is better understood from the following description, which taken in connection with the accompanying drawings, discloses a preferred embodiment thereof.

Figs. 1 and 1a of the drawings disclose a side view of my improved automatic machine, the view being taken from the burner side.

Figs. 2 and 2a of the drawings constitute a plan view of my improved apparatus.

Fig. 3 is an end view of the machine, taken on line 3—3 of Fig. 1a of the drawings.

Fig. 4 is a sectional view on line 4—4 of Fig. 1a.

Fig. 5 is a sectional view on line 5—5 of Fig. 4.

Fig. 7 is a partly sectional view on line 7—7 of Fig. 1.

Fig. 9 is a sectional view on line 9—9 of Fig. 8.

Fig. 10 is a detailed perspective view of one of the soldering irons.

Fig. 11 is a detailed sectional view of the carrier lug on the chain for automatically moving the cans through the machine, and being taken on line 11—11 of Fig. 9.

Fig. 12 is a detailed view of the means for automatically fluxing the side seam of the can, same being taken on line 12—12 of Fig. 1a.

Fig. 14 is a sectional view of the feeding mechanism for feeding the soldering wire to the soldering bath, same being taken on line 14—14 of Fig. 6.

Fig. 15 is a side view of the same, taken on line 15—15 of Fig. 14.

Fig. 16 is a view taken on line 16—16 of Fig. 1a.

In general, the machine for automatically carrying out my improved invention consists of a relatively long base 1, composed of two I-beams and a cross support mounted on a suitable pedestal 2. This base 1 supports the entire mechanism. In general, the mechanism comprises a relatively long horn or horse extending the length of the support 1, and free at each end so as to receive cans from one end and to discharge cans from its opposite end. In other words, the hollow can or container forms are slipped onto one end of this horn, traveling therealong with the horn inside of and supporting the can, and during this travel, the complete soldering operation takes place so that by the time the cans reach the opposite end of the horn, they are completely soldered and are discharged in finished condition.

The horn

Figure 1:
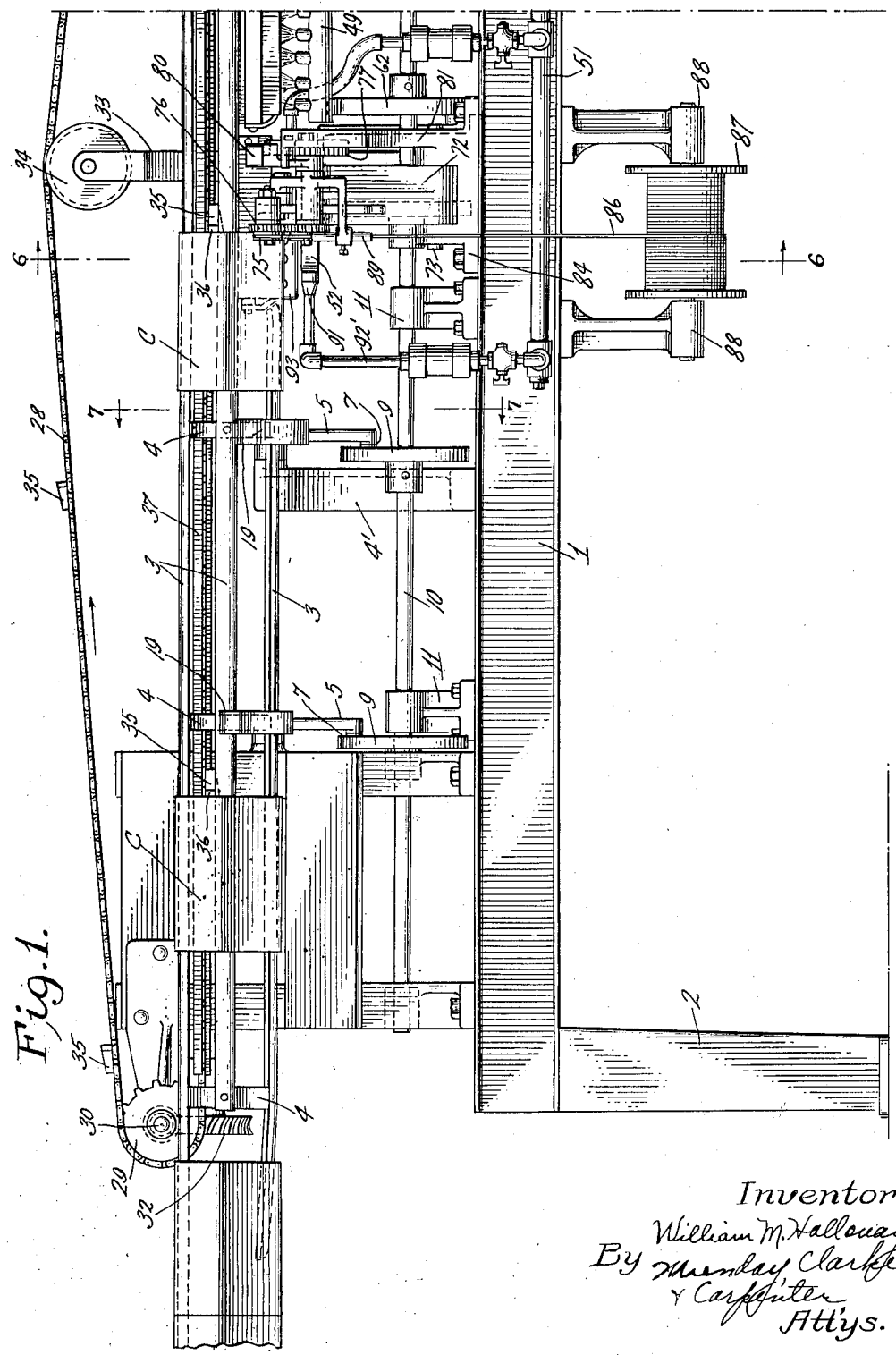

One of the novel features of my invention resides in the construction of a horn for guiding and supporting the cans in their travel through the machine. This horn is constructed and arranged in a floating manner, so as to permit the cans freely to be introduced over one end of the horn, to permit the cans to be moved freely therealong, and thence freely discharged from the opposite end of the can. Means are provided for automatically supporting various zones of the horn during the travel of the can therealong. In addition the horn is preferably constructed as a skeleton framework, and in the present instance is shown as comprising four longitudinally disposed track like elements substantially forming a cross section corresponding to that of the container body adapted to be soldered or operated upon. This arrangement of the horn permits the disposition of instrumentalities relative thereto for fluxing and soldering the inner seam of the can body as it passes along the horn. By reason of the floating arrangement and disposition of my horn relative to the remaining mechanism of the machine, it is evident that any particular horn may be quickly dismantled from the machine and replaced by a horn of another cross section, so that cans of any shape and size may be operated upon or soldered in my improved machine. In the particular embodiment illustrated the horn comprises the four tracks 3, which extend the length of the platform 1. These tracks at desired intervals are suitably supported and braced by a block or cross-piece 4 so as to provide a substantially rigid hollow horn. At the entering end of the machine, as shown in Fig. 1a, the ends of the horn 3 are slightly convergent so as to permit a can body to be slipped easily thereover, and if desired, the opposite end of the horn may be similarly converged so as to permit the discharge of the can therefrom. The horn is floatingly supported by a plurality of shiftable arms or supports, mounted on brackets 4', see Fig. 7, which brackets are in turn mounted on the I-beams 1. One of these shiftable arms comprises a bell crank lever 5 pivoted at 6 to the bracket 4', and has one end 7 thereof terminating in a roller running in a cam groove 8 of a cam 9 mounted on shaft 10, mounted in suitable brackets 11 carried by support 1. This shaft 10 is driven by means of a worm wheel 12, geared with the worm 13 on a shaft 14, on which is mounted a pulley 15, driven from a belt 16 from a motor or prime mover 17 on brackets 18 mounted on the end of support 1, as shown in Fig. 1a. The opposite end of the bell crank lever 5 is provided with a substantially hooked shape end 19, and a spaced hooked portion 20, which hooked portions are of the correct distance apart and shaped to firmly engage the outer faces of the lower tracks 3 of the horn, whereby to hold the horn firmly in horizontal position when the bell crank lever 5 is moved to its dotted line position as shown in Fig. 7. A plurality of these bell crank lever supports 5 may be provided along the length of the horn. In Fig. 1 of the drawings, there are shown two of such bell crank levers mounted in spaced apart relation and operable at varying times by means of the cams 9, and in such a way that when one of the supports 5 is bearing the weight of the horn, the other support 5 which is spaced fully the length of a can therefrom, is out of position so that the can is free to move therealong. These supports work in timed relation and are oppositely disposed so that when one is supporting the other is free, and vice versa.

In addition to these supports comprising the bell crank arms 5, the horn is also provided with additional supporting means shown in Fig. 4, which supporting means has a further function of preventing endwise movement of the horn. During the soldering operation and while the cans are being transported along the horn by means of the conveyor chain, there is a considerable drag on the horn, and since it is floatingly mounted, means must be provided for preventing this drag from carrying the horn endwise. A simple means is shown in Fig. 4, wherein the supporting blocks 4 of the horn are provided with a bore or passage 21 therethrough, adapted to receive plungers 22 mounted in suitable brackets 23 carried by upstanding support 24, mounted on the main support 1. These plungers are operated by means of levers 25 pivoted as at 26, to support 24, and operated by means of the cams 27. There are a plurality of supports of the construction illustrated in Fig. 4, arranged longitudinally of the horn. These are illustrated in Fig. 1a of the drawing, as disposed apart substantially the distance of a can body end with the cams arranged to operate in timed relation and in such a manner that when the plungers 22 of one of the supports are engaging, supporting and holding the horn from endwise movement, the plungers of the support spaced therefrom are withdrawn from the bore 21 so that a can is free to pass therealong. The various supports and means for holding the floating horn are all operated from cam shafts and in timed relation so that a successive number of cans pass uninterruptably and in a constantly moving stream lengthwise of the horn. In this manner the necessity of operating on stationary cans is overcome so that the capacity of the machine is increased and all danger of overheating a can by reason of its being stationary, is absolutely precluded. In other words, means is provided for permitting a succession of cans automatically to be fed on one end of a horn, passed therealong in a constantly moving stream, the soldering and other operations taking place upon the can as it is passed therealong, and finally the can is discharged from the free end of the horn.

The cans are pushed or fed along the horn continuously and in spaced relation by any desirable means. In the present instance this is accomplished by the sprocket chain conveyor 28 meshed with sprocket wheels 29, one of which wheels is mounted on a shaft 30, in turn driven by a worm 31 from a worm wheel 32 carried by the upright support 4. At an intermediate point, the frame work is provided with a bracket 33, upon which is mounted a wheel 34 for preventing any slack in the chain. This chain is provided at spaced intervals with conveyor lugs 35, which are provided with a vertical surface 36, when the chain is in this lowermost horizontal plane, which surface 36 is adapted to press against the rearmost edge of a can and feed it along the horn. A guideway and housing 37 is provided for the passage of the chain immediately above the horn. This is shown in Figs. 9 and 11. The function of this guideway is to provide a steadying means for preventing the chain from rising and for preventing disengagement of the lug 36 from the edge of the can body. This track or housing 37 is mounted on the outer end of an L-shaped bracket 38, which in turn has a bearing on one of the supports carried by the bed.

Automatic flux applying means

Figure 12:
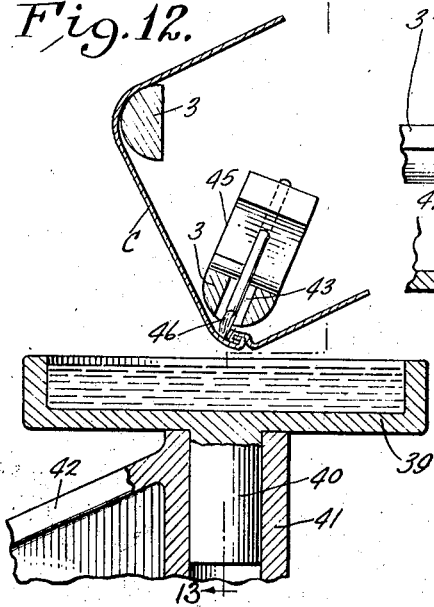

Devices are arranged for automatically applying a predetermined amount of flux to the inside surfaces of the side seam of the container body as it is continuously fed along the horn. In the present instance, these devices comprise a flux containing reservoir 39 in the shape of a shallow open topped pan, the bottom of which is provided with a lug 40 adapted to detachably set in an upstanding tube 41 carried by a bracket 42 carried on the bed 1. In the present instance, the reservoir 39 consists of two such shallow pans. These pans may be supplied with flux from a tank 39' which has a discharge nozzle 39'' extending therethrough. Immediately over these reservoirs is located one of the lower rails 3 of the horn. This rail is provided with a relatively long slot 42 and a block 43, in which is pivoted as at 44, a swinging block 45 carrying a brush 46, which in its normal position is adapted to dip in the flux of the pan 39. Any desirable means may be used to position the brush normally in the flux pan, such, for instance, as by weighting the block 45 or by means of a suitable spring. In the present mechanism these brushes are duplicated and are arranged in series, as disclosed in Fig. 1a of the drawings, whereby to provide a sufficient quantity of flux to be wiped on the seam. In the operation as the can is fed along the horn by the conveyor, the front edge 47 of the can C will strike the brush and raise it so that the brush will pass within the can end up along the inside of the seam as the can passes therealong, all as is illustrated in Fig. 12 of the drawings. It will be noted by this automatic arrangement just the desired quantity of flux will be applied to the can body, and this is the reason that the can is fed at a constant rate and the brush which necessarily carries a predetermined amount of flux, will convey this same quantity each time to the successive cans.

Preliminary heating of the can body

Means are provided for preheating the can seam to be soldered and thereby bringing it up to a temperature preparatory to the soldering operation. This is accomplished in the present instance by means of the burners 48 carried by the gas conduit 49 located immediately beneath the horn and in the path of the travel of the can C, that is, in the path of the travel of the seam of the can to be soldered. This gas conduit 49 is connected by means of a pipe 50 to the main gas line 51. Through this arrangement the walls of the can at the seam are brought up to the required temperature preliminary to soldering this. The flame 48 does not discolor or damage the outer face of the lithographed can body, for the reason that the can is constantly in motion and the flame is so regulated as to prevent any destructive results.

An additional means is provided for preheating the can seam to be soldered to bring it up to temperature preparatory to the soldering operation. This means is adapted to be heated by the gas flames 48 and is adapted to heat the inner wall of the side seam as distinguished from the outer wall of the side seam as heretofore described. In the present instance a means for heating the inner face of the side seam comprises a plurality of irons 66 which depend through a relatively long aperture in a bracket 67 carried by the iron 3. Each of these irons is constructed substantially as shown in Fig. 16 of the drawings, being formed with a head 70 having an overhanging shoulder adapted to limit the downward movement of the iron. In addition, each of the irons has a beveled side face 68 and a front facial inclination like that shown at 69 in Fig. 10. By means of this construction as a container travels along the iron from the position shown in Fig. 1a past the fluxing station it will contract the front inclination 69 of the first reheating iron 66 and move it upwardly so that the bottom or nose of the iron will rest on the inner surface of the side seam thereby heating the side seam. It will be noted that prior to the passage of the can into contact with the irons 66 they are being heated by the flames of burners 48 which are positioned thereunder. And therefore, as the can passes over the burners 48 the latter will heat the outside of the can while the preheated iron 68 will heat the inside of the can at the location of the seam.

The soldering mechanism

Figure 6:
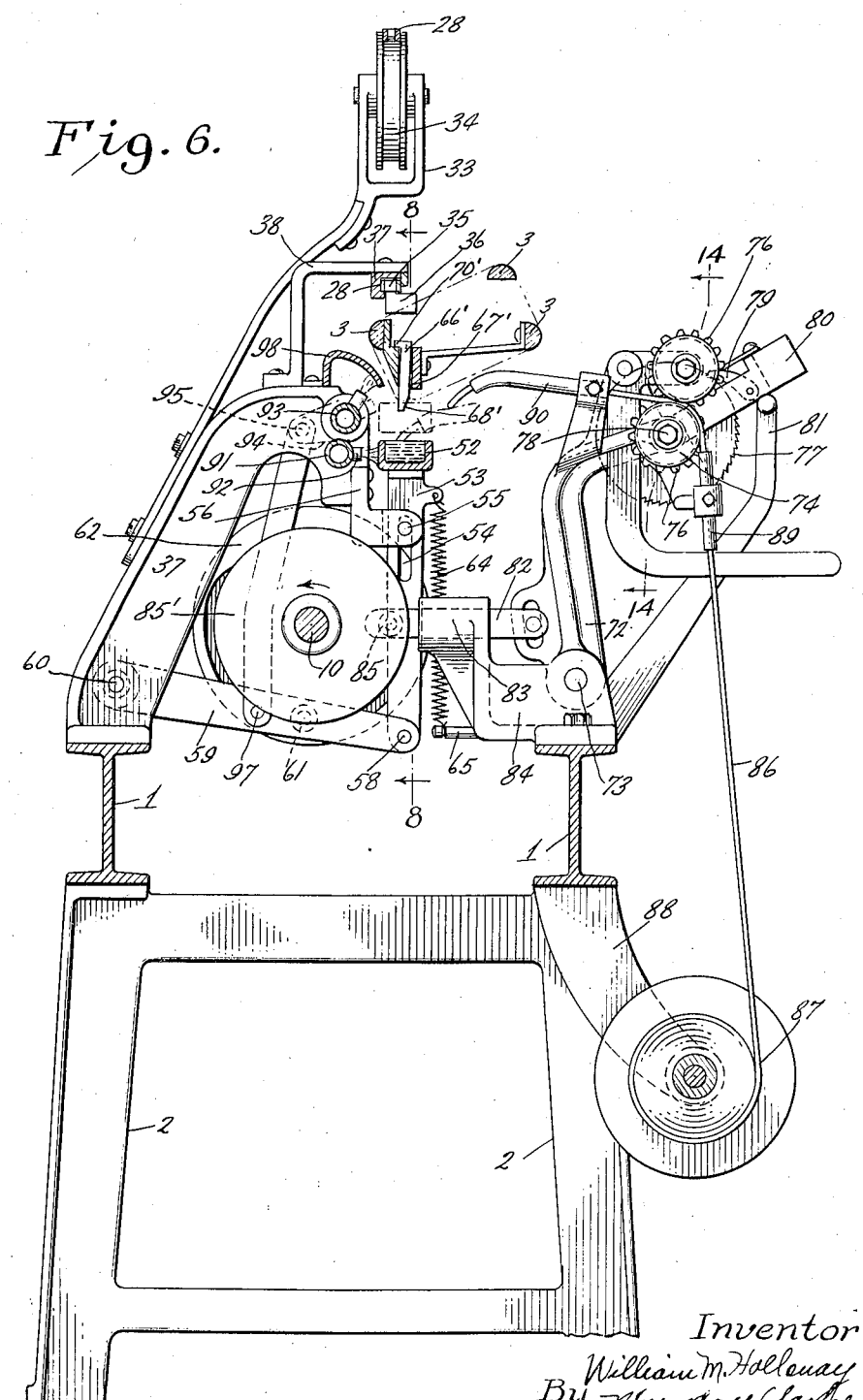
Fig. 6 is a sectional view on line 6—6 of Fig. 1.

The soldering mechanism consists of a plurality of soldering irons, a solder bath and heating means for the irons and for the bath. This mechanism is arranged so that the solder irons may dip into the solder bath, and then as the can passes along the horn it automatically raises the irons from the bath and positions them within the can so that they wipe the solder which adheres to the irons, directly onto the side seam. These soldering irons and the soldering reservoir are constructed and arranged so as to apply a predetermined amount of solder for soldering the seam. And the soldering irons are shiftably mounted and constructed and arranged so that they will automatically position themselves in operative soldering relation to the seam to be soldered. The soldering pot comprises a substantially open topped vessel 52, mounted on an upright reciprocating support 53 slotted as at 54, to engage a steadying pin 55 carried by a bracket 56 on an arm 57 mounted on support 1. The lower portion of this rod 53 is pivotally connected as at 58 to a lever 59 pivoted as at 60 to an arm 57. The lever 59 is reciprocated by means of a roller 61 operated by a cam 62 on the shaft 10 suitably driven from the source of power or motor 17. A coil spring 64 is connected to the rod 53 and to a pin 65. By this arrangement the spring keeps the soldering pot 52 in normal downward position, except when it is raised by means of the lever 59. When raised to dotted line position, as shown in Figs. 6 and 9, the solder in the pot 52 will be brought into contact with the soldering irons. This occurs when no can is passing underneath these soldering irons. Immediately upon passage of a can past the irons, the soldering pot is raised to apply more solder to the irons and is again dropped to permit the passage of the can. By the above described means solder is elevated or carried up to the irons from a point below the path of the cans. The soldering irons 66 loosely depend through an aperture in a bracket 67' carried by the horn tracks 3, as shown in Fig. 9. There is a plurality of these soldering irons, preferably four in number, and they are arranged with a wedge shaped lower face 68', a front wall 69' arranged at an inclination, and a ledge 70', the latter acting to limit the downward movement of the iron. The aperture in the support is somewhat wider than the width of the iron so that the latter will have loose play therein. This looseness in play in connection with the slanting front face 69' and particularly the wedge shaped face 68' of the iron, permits the iron automatically to seat itself at its lower point to one side of the seam S as shown in Fig. 9 of the drawings. In other words, the seam contacting with the wedge shaped face 68' will force the iron to the proper side of the seam so that the solder will always adhere to the cavity in the cam wall directly at the side of the seam. The lower cross sectional area of the soldering iron, the number of irons, and their depth of projection into the solder pot, together with the raising and lowering of the soldering pot so as to repeatedly dip the iron into the pot, all contribute to the end of applying a definite amount of solder to each can body seam as it passes therealong. This is a very important feature of the invention. Means is provided for feeding a fresh and predetermined amount of solder to the pot periodically, so that a constant and predetermined level of solder is maintained in the pot 52. This means comprises an arm 72 pivotally mounted as at 73 on the support 1. This arm carries at its outer end the two opposed feed rollers 74 and 75, geared together as at 76 and adapted to be driven by a toothed wheel 77 mounted on shaft 78 of one of said feed rollers. In addition, a pawl 79 carried by support 80 stationarily mounted on arm 81 of the support 1, engages the teeth of the wheel 77 so that when the arm 72 carrying the toothed wheel is operated, the pawl will feed the wheel 77 a notch each time so as to provide a feeding movement to the toothed wheel 77. The means for shifting the arm 72 comprises a link 82 sliding through a bearing 83 stationarily mounted on a bracket 84 and carrying at its inner end a cam roller 85 operated by cam 85. The solder wire 86 is mounted on a spool or rail 87 on a bracket 88 of the main frame, and this wire 86 passes upwardly through a guide 89, thence through or between the feed rollers and into a guide 90, from which it projects into a position adjacent the path of the solder pot 52, so that when the arm 72 is reciprocated forwardly, the projecting end of the solder wire 86 will be immersed in the molten solder in the pot 52 as the same is in its lowermost position, all as indicated in dotted lines in Fig. 6 of the drawings. When the solder wire 86 is thus dipped into the molten solder a predetermined amount each time is melted from the wire, so that the solder bath is constantly and automatically replenished a definite amount. This replenishment of the solder bath has an important bearing on fixing and determining the amount of solder applied to the seam, since it regulates the depth to which the soldering wires are immersed in the soldering bath.

*Heating means for irons and soldering bath*

Means is provided for heating the solder pot 52 so as to keep the solder therein in molten condition. In the present instance, the heating means comprises a gas tube 91 mounted on the front end of the arm 57 provided with a plurality of jets 92 directly facing the path of travel of the solder pot 52, so that when the latter is in lowered position as shown in Fig. 9, the flame will play directly upon the reservoir 39 and keep the solder hot. When the reservoir 39 is raised, the flame is automatically removed. The gas supply for the tube 91 consists of a connection therefrom to a gas pipe 92' connected to the main gas conduit 51.

Means is also provided for heating the soldering irons. This means is constructed and arranged so that the flame is projected onto these irons at their lower portions, and is controlled so that it will not heat the exterior face of the can body when the latter is having its inner seam soldered by the irons as the can passes along the horn. In the particular embodiment of my invention, it is proposed to deflect the path of projection of the flame from a position in which it strikes the lower portions of the soldering irons, to a position removed therefrom when the can body is passing along the horn. This is accomplished by providing a gas tube 93, which is adapted to be angularly shiftable by means of an arm 94 pivotally connected as at 95, to a link 96, in turn pivotally connected as at 97, to the link 59, so that when the link 59 is operated from the cam 62, the flame from jets 93' of the tube 93 will be deflected upwardly and beneath a plate 98 carried by the arm 57. In this manner the exterior decorated or lithographed face of the can body C is protected from the heat of the flame. Obviously other mechanism for accomplishing this same function will readily suggest themselves to those skilled in the art as being within the contemplation of the present invention, such as an arrangement whereby the gas flame is partially shut off or reduced in intensity, and thereafter projected into the path of the irons 68 at the required times.

Figure 8:
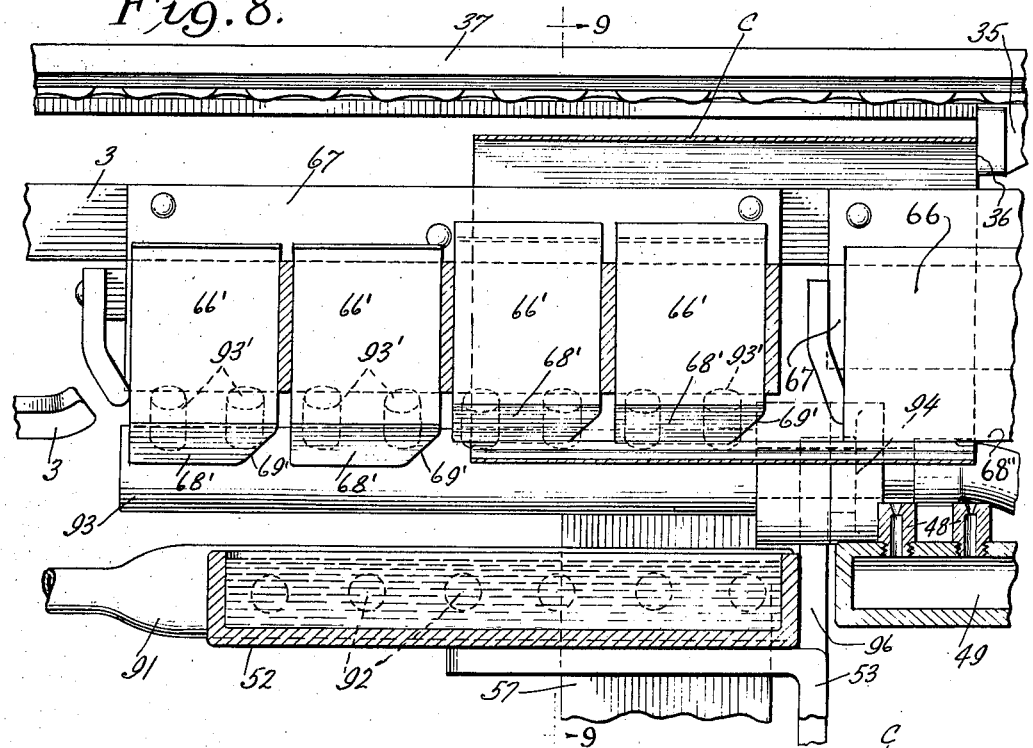
Fig. 8 is a sectional view on line 8—8 of Fig. 6.
Figure 13:
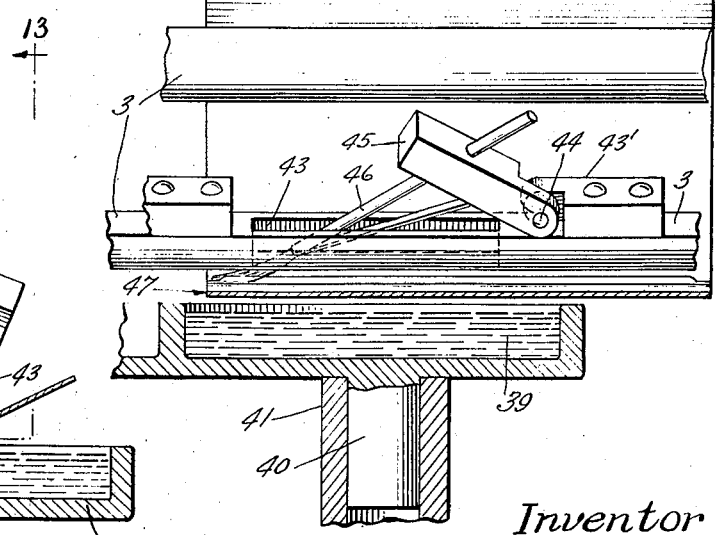
Fig. 13 is a sectional view taken on line 13—13 of Fig. 12.

It will be noted that the lowermost portion of the horn 3 is absent at the iron station, the end of which is shown at the left hand side of Fig. 8 of the drawings. The other interrupted end of the horn 3 is shown in Fig. 1a of the drawings immediately above the heating flame 48.

With reference to Figs. 1a and 2a, the instrumentalities at the right hand end of the figures indicate the bumping press from which the seamed cans may be fed by hand or otherwise onto the free end of the horn 3.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the class described, the combination of a horn, means for feeding a container along said horn, said container having a side seam adapted to be soldered and means for automatically soldering the inner face of said side seam and from within the container body during its passage along said horn, said soldering means including a solder iron shaped to be lifted by the lower part of the can body from a position below said part to a position at the level of the inner surface of said part.

2. In a device of the class described, the combination of a horn having free extremities adapted to permit the positioning of a hollow cam body over one end of the horn and adapted to have the horn discharge the can body from the opposite end of the horn, means for feeding the can body along said horn, said horn having a recessed portion and a plunger mounted adjacent said recessed portion, and means for automatically causing said plungers to engage said recessed portion to support said horn and hold it from endwise movement.

3. In a device of the class described, the combination of a horn having free extremities, means for passing a hollow can body over one end of the horn along said horn, and discharging the same from the opposite end of said horn, a plurality of radially movable plungers mounted in spaced relation longitudinally of the horn, means for automatically operating said plungers in timed relation with the passage of the can along the horn to cause said plunger to successively engage and withdraw from said horn, whereby each plunger successively engages and holds said horn from endwise movement during the passage of the can therealong.

4. In a device of the class described, the combination of a horn having free extremities, means for passing a can over one end of the horn therealong, and for discharging a can from the opposite end of the horn, means for supporting the horn along its length and at intervals spaced greater apart than the length of the can, said means comprising a plurality of radially movable plungers adapted to contact with said can and to hold the same from longitudinal movement, said plungers operating in timed relation with the movement of the can along the horn, and adapted to be withdrawn at predetermined times to permit passage of the can along the horn.

5. In a device of the class described, the combination of a horn adapted to receive a can body thereover, means for transporting the can body therealong, a reservoir of fluxing material, a radially movable flux applying member within the path of the can body adapted to be immersed in said fluxing material, means for automatically causing said fluxing member to contact with the inner wall of the side seam of the can body for fluxing said side seam during the passage of the can along said horn.

6. In a device of the class described, the combination of a horn adapted to receive a can body thereover, means for transporting the can body therealong, a reservoir of fluxing material, a flux applying member within the path of the can body and adapted to be immersed in said flux material, means for automatically withdrawing said flux applying member from said fluxing material and for bringing said member into contact with the inner walls of the side seam of said can body for fluxing said side seam during the passage of the can along said horn.

7. In a device of the class described, the combination of a horn, a flux reservoir, a flux applying member mounted on the horn and normally positioned within the path of the can body, means for feeding the can body along the horn, said flux applying member being constructed and arranged to be shifted by contact with the front edge of the can body as it moves along said horn into operating position within the can body so as to apply flux to the inner wall of the can body.

8. In a device of the class described, the combination of a horn, means for feeding a can body therealong, a flux applying member pivotally mounted on the horn and across the path of a wall of the can body whereby said flux applying member is shifted by the passage of the can body wholly into the interior of the can body so as to apply the flux to the inner wall of the can body during the passage of the can.

9. In a device of the class described, the combination of a horn, means for feeding a can body along said horn, said horn having an aperture therethrough, a brush pivotally mounted on said horn and adapted to project through said aperture, a flux reservoir into which said brush normally projects, said brush being normally disposed in the path of movement of the front edge of the can wall, whereby upon passage of the can said brush will be shifted into a position such that the brush with the flux thereon wipes across the inner face of the can wall.

10. In a device of the class described, the combination of a horn having free extremities and adapted to receive a can over one end of said horn and to permit the discharge of the can from the opposite end of said horn, means for feeding a can along said horn, a soldering iron mounted on said horn, means for applying solder to said soldering iron, means for heating said soldering iron, said iron having an upwardly inclined lower corner being constructed and arranged to be moved into position to apply solder to an inner wall portion of the can body by means of the movement of the can body along the horn.

11. In a device of the class described, the combination of a horn, means for feeding a can along said horn, a soldering iron, means for automatically supplying said soldering iron with heated solder, movable means for automatically and intermittently heating said soldering iron, and means for automatically applying said soldering iron to a wall of the can body, all of said automatic means being constructed and arranged to actuate in timed relation with the passage of the can body along the horn.

12. In a device of the class described, the combination of a horn, means for feeding a can body along said horn, a solder reservoir mounted adjacent the horn on one side of the plane of passage of a wall of the can body, a soldering iron carried by said horn and normally lying across said plane of passage of the can body, said iron being constructed and arranged to be shifted by the can body so as to lie wholly within the plane of passage of the can body and to apply solder to the inner wall of said can body during the passage of the can along the horn.

13. In a device of the class described, the combination of a horn, means for feeding a can therealong, a soldering iron, means for mounting said soldering iron whereby to cause the can body to shift said soldering iron and to cause said soldering iron to contact with the desired portion of the wall of the can body to apply solder thereto.

14. In a device of the class described, the combination of a horn, means for feeding a can therealong, a soldering iron depending from said horn and provided with an inclined surface adapted to be contacted by the front edge of the can body as the can body moves along said horn, said soldering iron being mounted so as to be raised by the contact of the can body with such inclined surfaces and to be positioned wholly within the can body so as to apply solder to the inner wall of the can body.

15. In a device of the class described, the combination of a horn, means for feeding a can body therealong, said can body having side seams to be soldered, a soldering iron mounted on said horn, said soldering iron having an inclined face adapted to contact with a surface of the side seam and said iron being mounted so that during said contacting period, said iron will be automatically shifted into solder applying position to one side of the side seam.

16. In a device of the class described, the combination of a horn, means for feeding a can along said horn, said can having side seams to be soldered, means for automatically shifting the soldering iron in one direction and means for automatically shifting the soldering iron in a different direction to position the soldering iron in exact soldering position.

17. In a device of the class described, the combination of a horn, means for feeding a can therealong, a soldering iron, said soldering iron having two inclined faces adapted to be contacted by different portions of the can body whereby automatically to position the soldering iron on the passage of the can along the horn.

18. In a device of the class described, the combination of a horn, means for feeding a can therealong, said can having side seams to be soldered, a bracket mounted on said horn, said bracket having an aperture therethrough, a soldering iron mounted on said bracket and freely depending through said aperture, means for restricting downward movement of said soldering iron, and said soldering iron having an operating face adapted to be contacted by the wall of the can body as it passes along said horn whereby to shift said iron within its mounting.

19. In a device of the class described, the combination of a horn, means for feeding a can body therealong, said can body having a side seam to be soldered, a support on said horn and a soldering iron freely depending from said support and in the path of a can body, said iron being constructed and arranged to be contacted by said can body and to be shifted into solder applying position.

20. In a device of the class described, the combination of a horn, means for feeding a can body therealong, a soldering iron, means for supporting said soldering iron, said soldering iron having an inclined frontal face and an inclined lateral face for contacting with the can body, and for automatically positioning the soldering iron into proper soldering position.

21. In a device of the class described, the combination of a horn, means for feeding a can therealong, a soldering iron shiftably mounted and adapted to apply solder to the side seam of said can, a solder reservoir, automatic means for shifting said solder reservoir and iron relatively to apply solder to said iron, automatic means for heating said solder, and automatic means for heating said iron, all of said means operating in timed relation with the passage of the can along the horn.

22. In a device of the class described, the combination of a horn having free ends to permit the insertion of a can body over one end of the horn and its discharge from the opposite end of the horn, means for feeding the can body along the horn, a soldering iron mounted on the horn and adapted to normally project across the plane of passage of a can wall containing the side seam, a solder reservoir, automatic means for shifting the solder reservoir into contact with the soldering iron, heating means for said iron, and automatic means for removing the heating means from said iron on the passage of the can body into contact with said soldering iron, all of said means being constructed and arranged to act in timed relation with the passage of the can body along the horn.

23. In a device of the class described, the combination of a horn, means for feeding a can body along said horn, said can body being mounted on said horn so as to enclose the latter, a soldering iron mounted on said horn and adapted to solder the inner side seam of the can, means for automatically applying solder to said soldering iron, and means for heating the soldering iron, said heating means being constructed and arranged to be removed from contact with the soldering iron during the passage of the can body along said horn and between the heating means and the iron.

24. In a device of the class described, the combination of a horn adapted to receive a can body thereon so as to enclose the horn, means for feeding the can body therealong, a soldering iron mounted on the horn and adapted to solder the inner wall of the side seam of the can, means for heating the soldering iron, said means being constructed and arranged to automatically withdraw the heat during the soldering operation.

25. In a device of the class described, the combination of a horn, means for feeding a can therealong, a soldering iron, means for automatically soldering the side seam of a can, and means controlled by the can for heating the soldering irons at predetermined times only.

26. In a device of the class described, the combination of a horn, means for feeding a can along said horn, a soldering iron for soldering the side seam of a can, heating means for the iron, comprising a projected flame, and means for automatically shifting the projecting flame into and out of contact with the iron during the passage of the can along the horn.

27. In a device of the class described, the combination of a horn, means for feeding a can therealong, a soldering iron adapted to solder the side seam of a can, heating means for the soldering iron comprising a projecting flame and means automatically operated by the passage of the can along the horn for shifting said flame into and out of contact with the soldering iron.

28. In a device of the class described, the combination of a horn, means for feeding a can along the horn, a soldering iron, means for shifting the soldering iron into contact with the side seam of the can, a solder pot, means for automatically shifting the solder pot into contact with the iron, means for heating the solder pot, means for heating the soldering iron, means for controlling the heating means for the solder iron, and means automatically operated in timed relation with the passage of the can along the horn for controlling the shifting movement of the solder pot and iron heating means.

29. In a device of the class described, the combination of a horn, means for feeding a can along the horn, with the can enveloping the horn, a soldering iron mounted on the horn and normally projecting across the path of movement of the can so as to be automatically shifted into solder applying position by the passage of the can, a solder pot mounted beneath the soldering iron, means for raising the solder pot into contact with the iron to apply solder to the iron, a flame normally playing upon said solder pot in one of its positions, a second flame normally playing upon said soldering iron in its normally depending position, and means operated in timed relation with the passage of the can along the horn for controlling the solder pot raising means and for shifting the heating means for the soldering iron.

30. In a device of the class described, the combination of a horn, means for feeding a can therealong, a soldering iron, a solder pot for the soldering iron adapted to contain a quantity of molten solder, means for automatically supplying said solder pot with a predetermined quantity of fresh solder.

31. In a device of the class described, the combination of a horn, means for feeding a can along said horn, a soldering iron, a solder pot for supplying solder to the soldering iron, said soldering pot containing a quantity of molten solder, means for feeding a predetermined quantity of solder to said solder pot.

32. In a device of the class described, the combination of a horn, means for feeding a can along said horn, a soldering iron, a solder pot adapted to be raised into contact with said iron to apply solder thereto, a solder nozzle adjacent said pot, means for feeding a strip of solder through said nozzle, means for automatically feeding the free end of said strip of solder into contact with the molten solder, whereby to supply said solder pot with fresh solder.

33. In a device of the class described, the combination of a solder pot adapted to contain a quantity of molten solder, a solder supplying member for the pot comprising a source of strip solder, means for automatically feeding a predetermined length of said solder, and means for shifting the end of said length of solder into contact with the molten solder in said pot.

34. In a device of the class described, the combination of a horn, means for feeding a can therealong, a soldering iron, means for heating said soldering iron, a solder pot adapted to contain a quantity of molten solder, means for shifting said molten solder in the pot into contact with said iron, means for feeding a predetermined quantity of solder to the solder pot comprising a length of solder, means for automatically feeding a definite quantity of said solder, and means for bringing the end of said length of solder automatically and periodically into contact with the molten solder in the pot.

35. In a device of the class described, the combination of a horn, means for feeding a can therealong, a soldering iron, a solder pot mounted adjacent said soldering iron, a source of strip solder mounted adjacent said soldering iron, means for automatically feeding a predetermined length of said strip solder, means for automatically bringing the end of said strip solder into contact with the molten solder in said pot, and for withdrawing the same, means for raising the pot into contact with the soldering iron, all of said means occurring in timed relation to the passage of the can along said horn.

36. In a device of the class described, the combination of a solder pot adapted to contain a quantity of molten solder, opposed feed wheels, a nozzle adapted to receive the discharge from said feed wheels, a nozzle disposed at the entrance of said feed wheel, a reel containing a length of strip solder, said solder extending from said reel through said wheels and through said nozzle, and means for operating said feed wheels to feed a predetermined length of solder through same, and means for shifting said nozzle to project the end of said strip of solder into the molten solder in said pot.

37. In a device of the class described, the combination of a horn, means for feeding a can therealong, a soldering iron, means for heating the soldering iron, a solder pot, means for shifting the soldering iron into contact with the solder pot, a source of solder supply, comprising an arm, a vertical nozzle mounted on said arm, feed members mounted on said arm, means for automatically feeding a strip of solder through said feeding members and through said nozzle, and means for automatically shifting said nozzle to bring the free end of said strip of solder into contact with the molten solder in the pot, said solder shifting means, said solder pot and said heating means for the iron all being constructed and arranged to be automatically operated in timed relation with the passage of the can along said horn.

38. In a device of the class described, the combination of a horn having free ends to permit a can body to be inserted over one end and to be discharged from the opposite end of said horn, means for feeding a can body along the horn, a plurality of soldering irons mounted on said horn in succession and adapted to depend across the plane of passage of the wall of the can body containing the side seam, a reservoir located beneath said irons into which they normally project a definite depth into the molten solder in said reservoir, said irons being constructed and arranged to be automatically raised by the passage of the can body along the horn, and to be shifted into solder applying position.

39. In a device of the class described, the combination of a relatively long horn, means for passing a succession of spaced apart can bodies over and along said horn with the can bodies enveloping the horn, and with the side seams of the can bodies arranged on the inner walls thereof, a plurality of soldering irons depending from said horn and arranged in series thereon, a solder reservoir located beneath said irons and into which said irons normally project a predetermined depth, said irons being constructed and arranged to be successively raised by the passage of the can bodies along the horn, and said irons being constructed and arranged to be immediately lowered upon the passage of a can body so as to dip again into a predetermined depth of the solder in the reservoir.

40. In a device of the class described, the combination of a relatively long horn, means for passing a succession of spaced apart can bodies over and along said horn with the can bodies enveloping the horn, and with the side seams of the can bodies arranged on the inner walls thereof, a plurality of soldering irons depending from said horn and arranged in series thereon, a solder reservoir located beneath said irons and into which said irons normally project a predetermined depth, said irons being constructed and arranged to be successively raised by the passage of the can bodies along the horn, and said irons being constructed and arranged to be immediately lowered upon the passage of a can body so as to dip again into a predetermined depth of the solder in the reservoir, means for automatically and periodically supplying said reservoir with a perdetermined quantity of solder, whereby to control the depth of projection of the irons into the molten solder in the reservoir.

41. A soldering machine for metal can bodies comprising an inside supporting horse along which the can bodies to be soldered are moved, a series of soldering irons yieldingly mounted on said horse, and over which the can bodies pass, means holding said irons from rotation, and a solder bath below the path of the cans, said irons successively engaging the side seam of the can body at the inside thereof and receiving solder from said bath at the face of the irons which thereafter make contact with the side seam, only during the intervals between the passing can bodies.

42. A soldering machine for metal can bodies comprising an inside supporting horse along which the can bodies to be soldered are moved, a series of solder irons mounted on said horse and around which the can bodies pass, said irons successively engaging the side seam of the can body at the inside thereof, and means for elevating solder to said irons from a point below the path of the cans during the interval when a can body is not present on the horn opposite said elevating means.

WILLIAM M. HOLLOWAY.